C. R. UNDERHILL.
VENTING WASHER.
APPLICATION FILED MAR. 27, 1922.

1,436,738.      Patented Nov. 28, 1922.

Inventor
Charles R. Underhill.
By his Attorney
Maxwell Barus.

Patented Nov. 28, 1922.

1,436,738

UNITED STATES PATENT OFFICE.

CHARLES R. UNDERHILL, OF BROOKLYN, NEW YORK, ASSIGNOR TO BETTS ELECTRIC & MANUFACTURING CORPORATION, A CORPORATION OF NEW YORK.

VENTING WASHER.

Application filed March 27, 1922. Serial No. 547,182.

*To all whom it may concern:*

Be it known that I, CHARLES R. UNDERHILL, a citizen of the United States, residing in borough of Brooklyn, county of Kings, city and State of New York, have invented certain new and useful Improvements in Venting Washers, of which the following is a specification.

The object of my invention is to provide a new and improved type of washer suitable for use in connection with caps or other devices for closing vessels or cells which it is desirable to vent. It is well adapted for use in connection with caps for storage battery cells or liquid level indicating switches designed to replace such caps.

Figure 1:
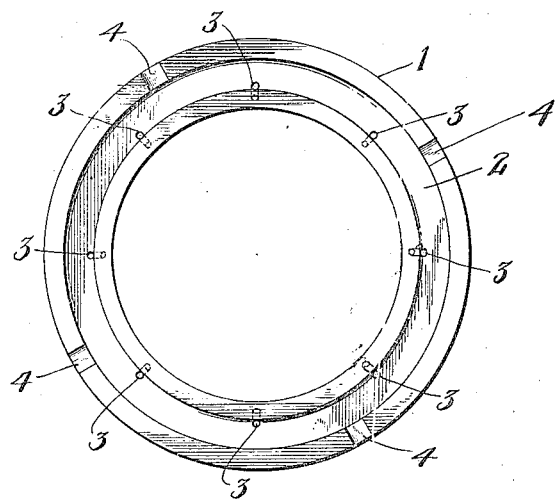
Figure 2:
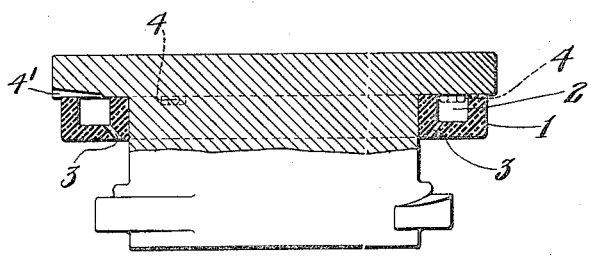

Referring to the drawings, Fig. 1 shows a top plan view of my improved washer and Fig. 2 a section of my washer as applied to a battery cell cap.

The washer 1 is made of rubber or other suitable packing material and molded in the usual annular form having a rectangular cross section.

In the top of the washer 1 is provided the annular groove 2 from which lead downwardly and inwardly a plurality of small vent holes 3. In the upper, outer rim of the washer 1 are provided small recesses 4 for connecting the groove 2 with the atmosphere. The vents 3 and recesses 4 may advantageously be staggered with relation to each other. Obviously instead of making such recesses 4 in the upper outer rim, the outer rim may be left uniform and recesses 4' be provided in the cap to connect the groove 2 with the atmosphere as indicated in the left hand side of Fig. 2.

By means of my washer an effective ventilating system is provided and at the same time the connection between the vessel and cap is effectively packed to prevent the liquid contents of the vessel from spilling out even if the vessel be subjected to more or less violent agitation. Moreover, the groove 2 affords a condensation chamber in which vapors escaping from the vessel may be condensed and returned by the vent holes 3 to the vessel. Thus evaporation through the venting system is minimized. Moreover, by reason of the plurality and arrangement of the several vent passages the venting system provided by the use of my washer is not apt to become clogged thereby possessing another decided advantage as compared with most cover venting devices.

It will be obvious from the foregoing that various changes may be made in the form and details of the washer herein described without departing from the spirit and scope of my invention.

What I claim is:

1. A venting washer, provided with a groove in its top side and vent passages leading downwardly and inwardly from said groove through the washer.

2. A venting washer, provided with a groove in its top side, vent passages leading downwardly and inwardly from said groove through the washer, and vent passages connecting said groove with the atmosphere.

3. In a venting washer for receptacle closures, a groove on the upper face thereof, and vent passages adapted to connect said groove with the interior of a receptacle to which the washer may be applied.

4. In a venting washer for receptacle closures, a groove on the upper face thereof, vent passages adapted to connect said groove with the interior of a receptacle to which the washer may be applied and vent passages connecting said groove with the atmosphere.

CHARLES R. UNDERHILL.